(12) United States Patent
Graven

(10) Patent No.: US 10,236,988 B1
(45) Date of Patent: Mar. 19, 2019

(54) MULTI SPECTRUM INTERNET ACCESS APPLIANCE

(71) Applicant: LED Lighting IQ LLC, North Olmsted, OH (US)

(72) Inventor: John T Graven, North Olmsted, OH (US)

(73) Assignee: LED Lighting IQ LLC OH (US)

( * ) Notice: Subject to any disclaimer, the term of this patent is extended or adjusted under 35 U.S.C. 154(b) by 0 days.

(21) Appl. No.: 15/647,925

(22) Filed: Jul. 12, 2017

Related U.S. Application Data

(60) Provisional application No. 62/362,441, filed on Jul. 14, 2016, provisional application No. 62/362,445, filed on Jul. 14, 2016.

(51) Int. Cl.
| | | |
|---|---|---|
| *H04B 10/114* | (2013.01) | |
| *H04B 10/116* | (2013.01) | |
| *H04B 10/50* | (2013.01) | |
| *H04L 12/10* | (2006.01) | |
| *H04L 29/06* | (2006.01) | |
| *H04W 88/08* | (2009.01) | |

(52) U.S. Cl.
CPC ......... *H04B 10/502* (2013.01); *H04B 10/116* (2013.01); *H04L 12/10* (2013.01); *H04L 69/16* (2013.01); *H04W 88/08* (2013.01)

(58) Field of Classification Search
CPC ....................................... H04B 10/114–10/116
See application file for complete search history.

(56) References Cited

U.S. PATENT DOCUMENTS

| | | |
|---|---|---|
| 6,879,263 B2 | 4/2005 | Pederson et al. |
| 7,046,160 B2 | 5/2006 | Pederson et al. |
| 8,188,878 B2 | 5/2012 | Pederson et al. |
| 8,428,469 B2 | 4/2013 | Kim et al. |
| 2012/0002651 A1 | 1/2012 | Yoon et al. |
| 2015/0233536 A1* | 8/2015 | Krames ..................... F21K 9/56 362/84 |
| 2016/0164688 A1* | 6/2016 | Yseboodt ........... H05B 37/0254 307/1 |
| 2017/0318460 A1* | 11/2017 | Kumar .................. H04W 12/06 |
| 2017/0368210 A1* | 12/2017 | David ................... A61L 2/0052 |
| 2018/0069270 A1* | 3/2018 | Okabe ............... H01M 10/4207 |

* cited by examiner

*Primary Examiner* — Shi K Li
(74) *Attorney, Agent, or Firm* — John D. Gugliotta

(57) ABSTRACT

An internet access point that combines multi spectrum wireless connectivity into a solid state LED lighting element and fixture is provided for a total integrated network environment. The system includes: a composite wireless access point; a connection cable; and a power mechanism. The power mechanism provide a gateway between the lighting and a variety of power sources, including conventional grid power. A modular server cabinet provides a grid tie point. Each server element provides a plurality of PCB mounted RJ45 connecters for electrical connection with low voltage panel lighting through network patch cables. The cables terminate between the power server rack and a low voltage panel light/wireless internet access point to provide 24 VDC power. The instant abstract is neither intended to define the invention disclosed in this specification nor intended to limit the scope of the invention in any way.

14 Claims, 9 Drawing Sheets

22a

MULTI SPECTRUM INTERNET ACCESS APPLIANCE

RELATED APPLICATIONS

There present application claims the benefit of U.S. Provisional Application 62/362,441, filed on 14 Jul. 2016, and includes technology and teachings for a direct current power server for use in conjunction with the present invention as described in U.S. Provisional Patent 62/362,445 in the name of the present inventor filed on 14 Jul. 2016, both of which are incorporated by reference as if fully rewritten herein. There are no other previously filed, nor currently any co-pending applications, anywhere in the world.

BACKGROUND OF THE INVENTION

1. Field of the Invention

The present invention relates generally to wireless network systems, and more particularly, to an internet access point that combines multi spectrum wireless connectivity into a solid state LED lighting element and fixture.

2. Description of the Related Art

The integration of wired and wireless networks throughout residential, commercial and industrial structures constantly encounter impediments to ubiquitous connectivity. Further, due to recent trends, such as the exhaustion of frequencies in the Radio Frequency (RF) band, crosstalk probability between several wireless communication technologies, increased demand for communication security, and the advent of an ultra high-speed ubiquitous communication environment of 4G wireless technology, interest in optical wireless technology compatible with RF technology has increased.

Concurrently, Light Emitting Diodes (LEDs) have been rapidly introduced for general, area, accent and task lighting throughout residential and commercial markets. Lighting, in general and according to building codes, is usually ubiquitous throughout most structures. Consequently, if a network's wireless internet access capability were to be combined with or facilitated by the lighting system of the same space, increases in connectivity availability and decreases in wireless coverage gaps could be achieved. Further, such a solution may result in synergies in hardware, installation, operation and maintenance.

Visible light communication, which transfers information using visible light, has been used to improve wireless network communication. Such methods have been found advantageous in that it can accurately recognize a reception range of information, has low power requirement, is safe to install and use, has a broad use band, and can be used without restriction.

The present invention utilized a series of solid state LED lighting element and fixture that may be powered from a direct current microgrid established within a facility. The lighting network provides otherwise conventional lighting tasks using energy efficient fixtures. The direct current microgrid may further utilize any number of a variety of power sources, including renewable (wind, solar, biomass, etc.) in addition to the conventional grid power. An internet access point that combines multi spectrum wireless connectivity is included in the solid state LED lighting element and fixture. With the production of light being tunable throughout the color spectrum, a composite radio signal can further communication data traffic utilizing a common appliance and in a form factor that can be ubiquitously applied throughout just about any occupied, building code compliant structure.

SUMMARY OF THE INVENTION

It is thus an object of the present invention to provide a multi spectrum internet access point that may be plug and play ready for a wireless internet network.

It is a feature of the present invention to provides an internet access point that combines multi spectrum wireless connectivity into a solid state LED lighting element and fixture.

Briefly described according to a preferred embodiment of the present invention, a combined lighting and communication appliance provides a wireless access point in conformance with IEEE 802.3bt four-pair Power over Ethernet standard. A light emitting diode (LED) further provides 1800 lumen of color spectrum tunable light in a 6 inch diameter solid state fixture. A solid state network interface card using pulse width modulation provides 16 gigabits of bandwidth. The network interface card also provides 1 gigabit of 2.4 Ghz radio signal for TCP/IP data traffic. Additionally, the network interface card may power ancillary functionality, such as energy harvesting or occupancy sensors.

It is an advantage of the present invention to provide an improved internet access point.

It is another advantage of the present invention to provide an internet access point that creates multi spectrum wireless connectivity.

It is yet another advantage of the present invention to provide an internet access point combined within a solid state lighting fixture.

Further advantages of the present invention provide such a fixture that can aid in achieving ubiquitous connectivity to a network within a given space, thereby increasing connectivity availability and deceased wireless coverage gaps within a facility.

It is yet another advantage of the present invention to provide such an improved internet access point that utilizes existing radio frequency standards.

It is still other advantages of the present invention to provide such an invention that results in synergies in hardware utilization, installation, operation and maintenance.

It is another advantage of the present invention to utilize energy efficient lighting fixtures.

It is still another advantage of the present invention to provide such an invention that may utilize any number of a variety of power sources.

It is still yet another advantage of the present invention to provide low voltage lighting in which the production of light is tunable throughout a color spectrum.

It is yet another advantage of the present invention to provide for the generation of visible light in combination with a composite radio signal.

Further still, an appliance of the present invention may utilize a form factor that is easily applied or adapted.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The best mode for carrying out the invention is presented in terms of its preferred embodiment, herein depicted within the Figures.

1. Detailed Description of the Figures

Figure 1:
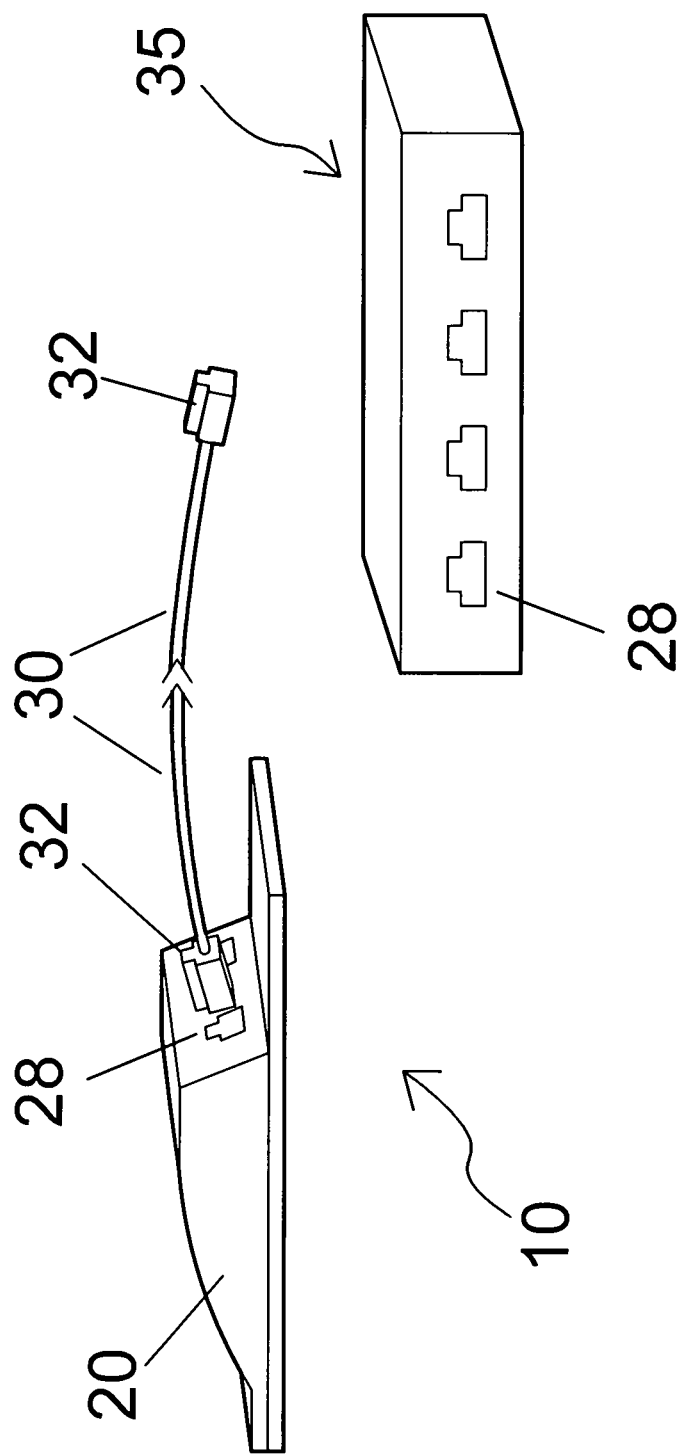
FIG. 1 is a schematic representation of a multi spectrum internet access appliance according to a preferred embodiment of the present invention.
Figure 2:
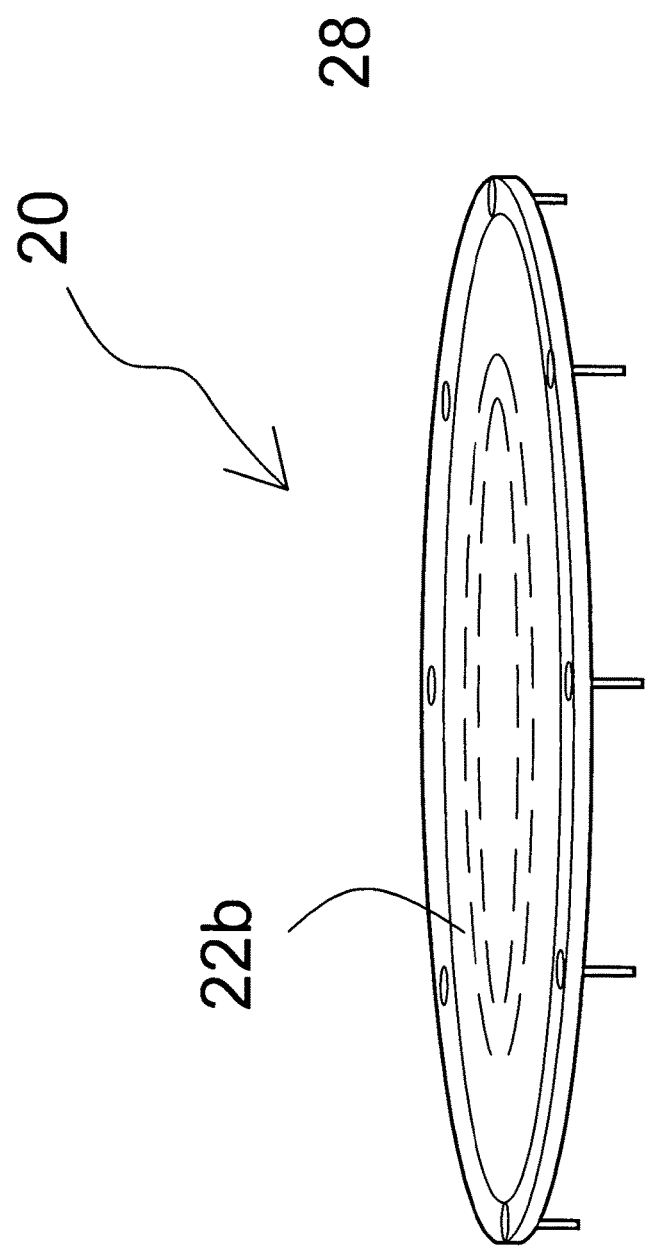
FIG. 2 is a perspective schematic of a wireless internet access point 20 for use therewith.

Referring now to FIG. 1, a multi spectrum internet access appliance, generally noted as 10, is provided according to a preferred embodiment of the present invention. The appliance comprises three basic elements: a composite wireless access point 20; a connection cable 30; and a power mechanism 35.

Referring now in conjunction with FIGS. 2 and 6-9, the composite wireless access point 20 provides both a wireless internet access point 22 in combination with an LED lighting element and fixture 24. As shown in greater detail in conjunction with FIG. 5, the wireless internet access point 22 incorporates a reflector plate 22a with antenna 22b. A heat sink assembly 22c is provided in contact with the fixture 24, as well as a network interface card 22d that provides wireless communication in conformance with IEEE 802.3bt four-pair Power over Ethernet standard. The solid state network interface card 22d using pulse width modulation provides 16 gigabits of bandwidth. The network interface card 22d also provides 1 gigabit of 2.4 Ghz radio signal for TCP/IP data traffic.

Additionally, the network interface card may power ancillary functionality, such as energy harvesting or occupancy sensors.

Figure 5:
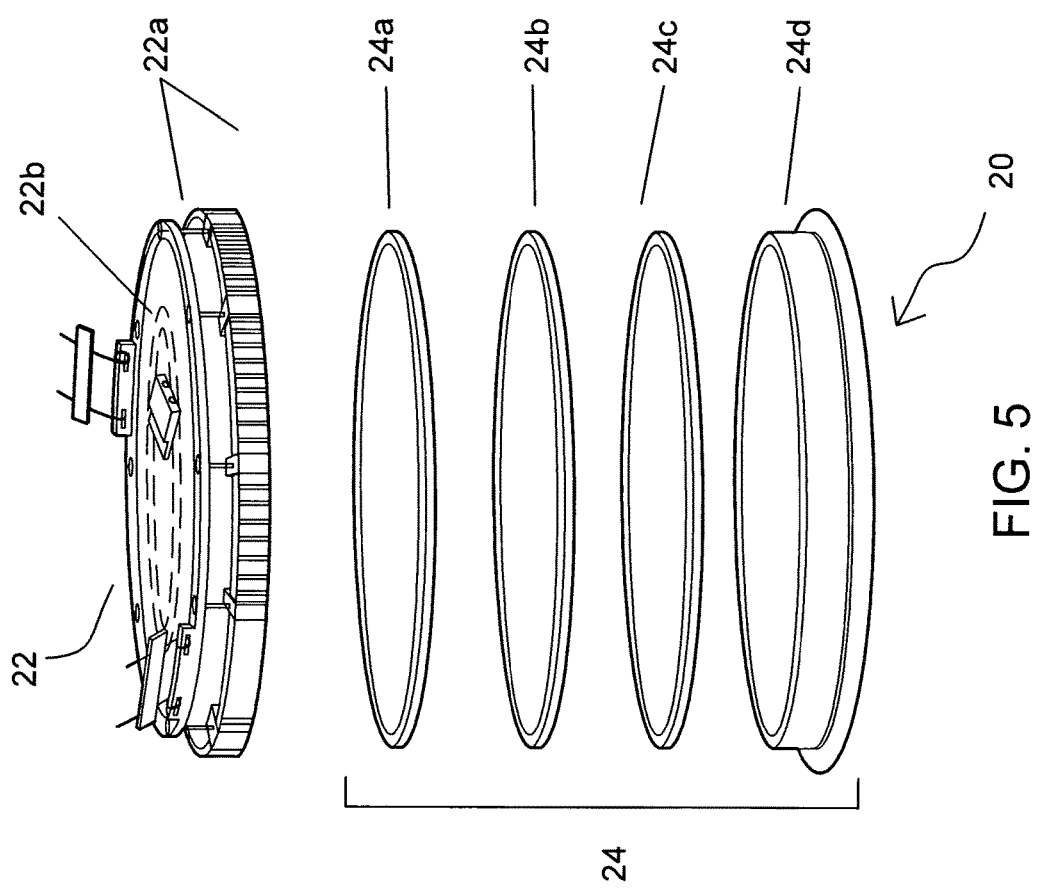
FIG. 5 is an exploded perspective view of the wireless internet access point 20 for use with the present invention.
Figure 6:
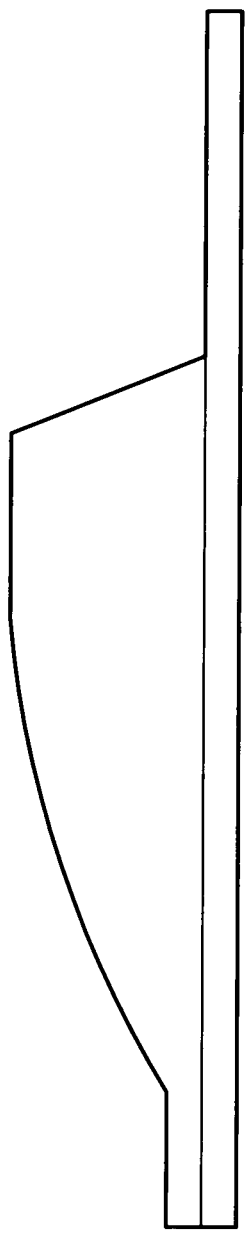
FIG. 6 is a left side elevational view thereof, the opposite side being a mirror image.
Figure 7:
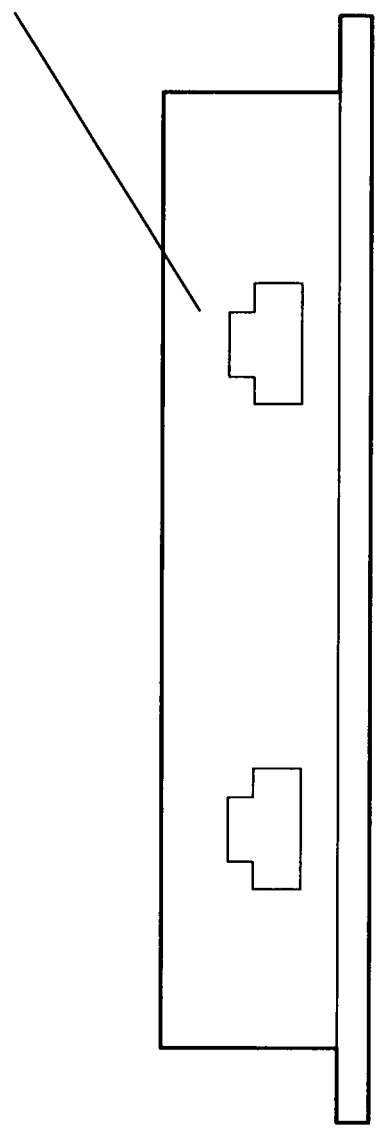
FIG. 7 is a front elevational view thereof.
Figure 8:
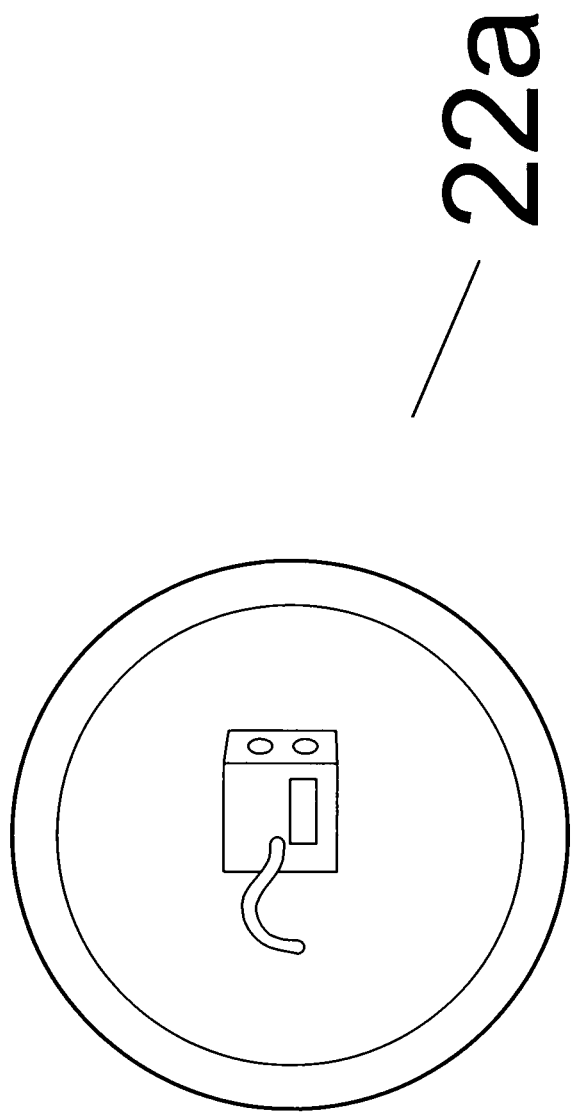
FIG. 8 is a bottom plan view thereof.
Figure 9:
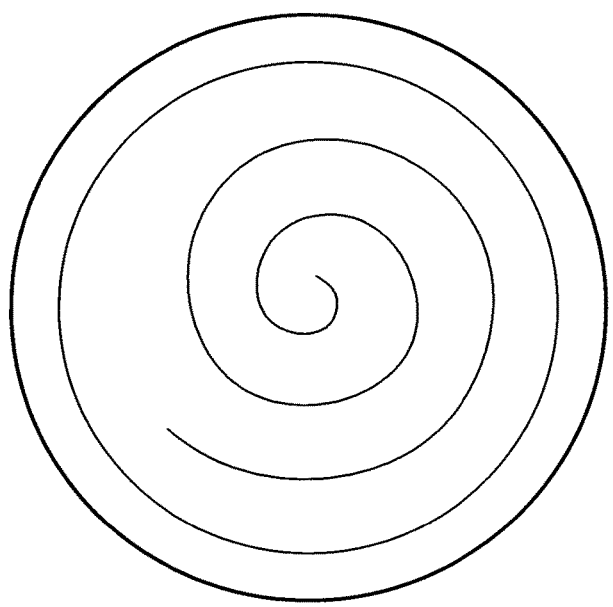
FIG. 9 is a top plan view thereof.

As detailed best in conjunction with FIG. 5, the LED lighting element 24 provides solid state lighting sources on a printed circuit board 24a. The generated illumination is transmitted through a light guide plate 24b that utilizes pulse-width-modulation focusing of illumination. A diffuser 24c provides a spread or scatter of the light in a manner that provides a desired appearance. The production of visible light may be tunable throughout the color spectrum. According to one aspect of the present invention, the light emitting diodes (LED) further provide at least 1800 lumen of color spectrum tunable light in a 6 inch diameter solid state fixture 20. A trim ring 24d can provide one such form factor that replicates the size and function of otherwise conventional recessed can lights (ceiling lights). One such design choice may be easily implemented in retrofit construction within existing structures by replacement into the form factor of existing fixtures. However, it should be noted by those having ordinary skill in the relevant art, in light of the present teachings, that such a feature is not meant to be treated as a limitation of the present invention, but rather is merely provides as exemplary and a broad range of form factors may be similarly or equivalently utilized.

Figure 3:
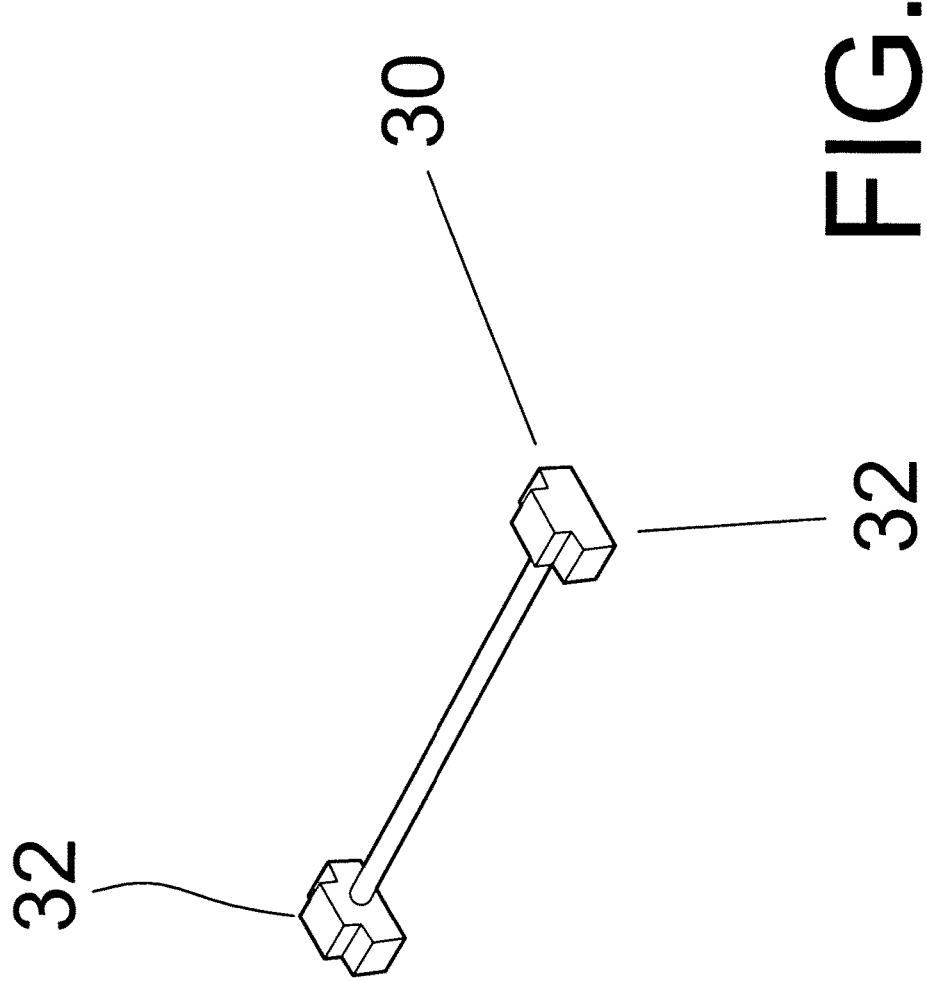
FIG. 3 is a perspective view of a cable 30 for use therewith.

Referring now in conjunction with FIG. 3 the connection cable 30 for use with the present invention is shown in greater detail. While it should be apparent to one having ordinary skill in the relevant art, in light of the present teachings, that the displayed connection cable 30 may be generally exemplary, for purposes of enabling a preferred embodiment at time the present invention was reduce to practice it may be envisioned that such cables 30 may at least be capable of Power Over Ethernet (POE) electrical communication between the power server 35 and composite wireless access point 20, each of which may include a proprietary connection configuration in at least one PCB mounted female RJ45 connecter 28 for electrical connection with a male RJ45 connector 32 for low voltage through a standard, low voltage Category 5e or Category 6 network patch cables. The Cat 5/6 network cables terminate between the power mechanism 35 and the access point 20 to provide 24 VDC power there between.

Figure 4:
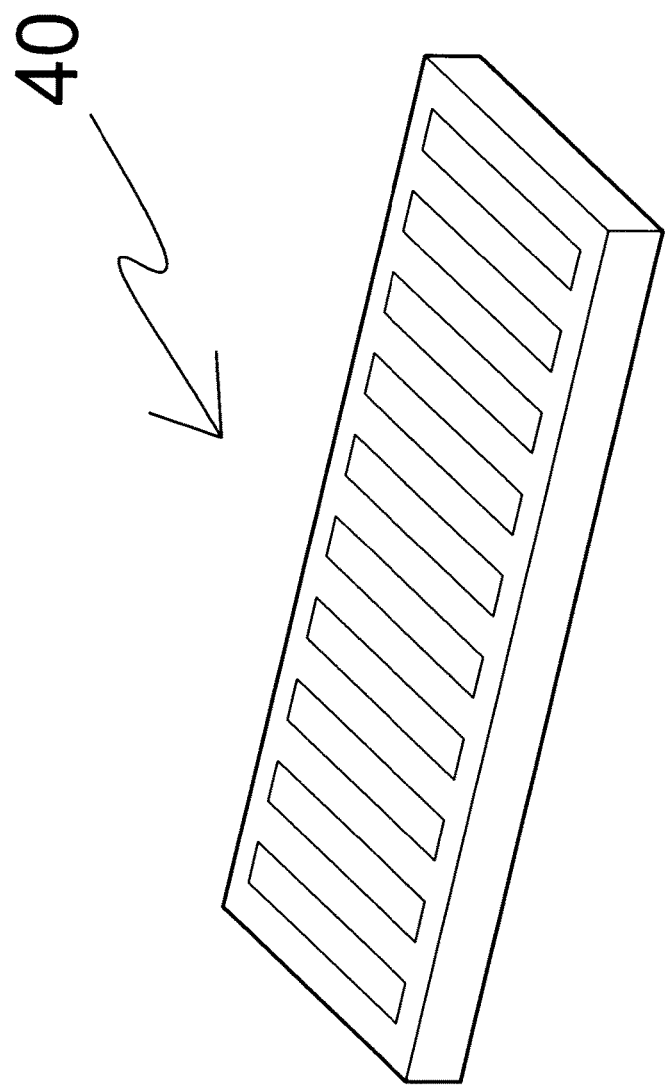
FIG. 4 is a perspective view of a power server element 40 for use therewith.

Referring now in conjunction with FIG. 4 power mechanism 35 is shown. It is intended that a preferred power mechanism 35 may include a direct current power sever, depicted schematically as 40 and more fully described in greater detail in U.S. Provisional Patent Application 62/362, 445, filed on 14 Jul. 2016 by the instant inventor and incorporated by reference herein as if fully rewritten. For clarity herein, and not intended to contradict the teachings of the incorporated reference, the power server element 40 provides a gateway between low voltage power sources and low voltage power loads, and can control, monitor and/or meter utility power being drawn from or sent to the power grid. This distributed energy storage system provides a grid tie point and bidirectional interface for a total integrated network environment. A modular server cabinet (not show) provides a grid tie point and provides modular, scalable housing of power server elements 40. The power server element 40 are standardized rack mounted housing that provide a modular platform for containing a number of mobile battery modules. Each mobile battery module includes a plurality of cooperatively engaged lithium ion battery cells, and each mobile battery module within the server element is cooperatively engaged to one another in parallel electrical communication. Each server element provides a standardized size, rack mounted housing of a proprietary configuration in which a first end panel provides a plurality of PCB mounted female RJ45 connecters 28 for electrical connection with low voltage panel lighting through standard, low voltage Category 5e or Category 6 network patch cables 30. The Cat 5/6 network cables terminate between the power server rack and a low voltage panel light to provide 24 VDC power thereto. The server element provides a gateway between low voltage power sources and low voltage power loads, and can control, monitor and/or meter utility power being drawn from the power grid.

This distributed energy storage system 35 provides a grid tie point and bidirectional interface for a total integrated network environment.

2. Operation of the Preferred Embodiment

In commercial, industrial and office buildings the recent increased interest in renewable energy has led to increased use of power generation sources such as wind turbine generators, photovoltaic cells (PV), fuel cells, batteries and the like. These technologies are sources that provide a relatively low voltage output of direct current. These DC sources are generally connected in serial or parallel circuits to obtain a sufficiently high voltage, which is then inverted to AC prior to being distributed onto the power grid.

Similar conservation motives are causing replacement of incandescent and fluorescent lighting with solid state, LED based lighting sources. Lighting is generally a majority use of electricity in residential and commercial settings. These solid state devices use low, DC current (normally lower than 3V), so that many of them need to be connected serially to achieve the required operating voltage.

With the ever expanding application of low voltage DC power sources, concurrent with the ever expanding application of low voltage DC power loads, currently in commercial, industrial and office buildings, and in the near future in other buildings including residential, the management and distribution of DC power in conjunction may be done with the creation of microgrids throughout the space to provide local and distributed utilization of such assets, as well as to interface with the larger AC power grid.

In conjunction with the application of the multi spectrum internet access appliance 10 of the present invention, an additional benefit to the application of DC power microgrids and utilization of or retrofit to solid state LED lighting elements and fixtures may include improved internet access connectivity through the inclusion of wireless internet access with the solid state LED lighting element and fixture. With the production of light being tunable throughout the color spectrum, a composite radio signal can further communication data traffic utilizing a common appliance and in a form factor that can be ubiquitously applied throughout just about any occupied, building code compliant structure.

A variety of client devices heretofore having been enabled to connect to host devices may now have additional network connectivity. Whether traditional user implemented network devices (computers, smartphones, etc.) or the improved implementation of Internet of Things (IOT) devices, industrial automation device, home automation devices, or any similar or future developed client device, the application of the present device, system and method may improve the implementation of any such data networked application in a manner that further facilitates the application of renewable energy resources of any type. Further, such applications may provide an internet access point that creates multi spectrum wireless connectivity and may achieve ubiquitous connectivity to a network within a given space results in synergies in hardware utilization, installation, operation and maintenance.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents and limited only by following claims.

What is claimed is:

1. A multi spectrum internet access appliance comprising:
a composite wireless access point combining data communication access and an illumination element;
a power mechanism for providing low voltage direct current;
a connection cable in electrical communication between said composite wireless access point and said power mechanism;
at least one wireless internet access point;
at least one LED lighting element;
a fixture having a singular form factor for supporting both said wireless internet access point and said LED lighting element;
an illumination reflector plate;
an antenna;
a heat sink assembly in contact with the fixture; and
a solid state network interface providing wireless communication through said antenna in conformance with a standard Power over Ethernet protocol.

2. The multi spectrum internet access appliance of claim 1, wherein said standard Power over Ethernet protocol comprises IEEE 802.3bt four-pair Power over Ethernet standard.

3. The multi spectrum internet access appliance of claim of claim 1, wherein said solid state network interface card provides at least 16 gigabits of bandwidth.

4. The multi spectrum internet access appliance of claim of claim 2, wherein said solid state network interface card provides at least 16 gigabits of bandwidth.

5. The multi spectrum internet appliance of claim 3, wherein said network interface card further provides 1 gigabit of 2.4 Ghz radio signal for TCP/IP data traffic.

6. The multi spectrum internet appliance of claim 4, wherein said network interface card further provides 1 gigabit of 2.4 Ghz radio signal for TCP/IP data traffic.

7. The multi spectrum internet appliance of claim 5, wherein said network interface card controls ancillary functionality selected from a group comprising: energy harvesting; and occupancy sensors.

8. The multi spectrum internet appliance of claim 6, wherein said network interface card controls ancillary functionality selected from a group comprising: energy harvesting; and occupancy sensors.

9. The multi spectrum internet appliance of claim 1, wherein said LED lighting element provides production of visible light that may be tunable throughout a color spectrum.

10. The multi spectrum internet appliance of claim 9, wherein said LED lighting further provides at least 1800 lumens of color spectrum tunable light.

11. The multi spectrum internet appliance of claim 2, wherein said connection cable comprises:
Power Over Ethernet (POE) electrical communication between the power server and composite wireless access point;
a male RJ45 connecter at a first end;
a female RJ45 connector at a second end; and
said power mechanism further comprises a first female RJ45 connector adapted for electrical communication with said male RJ45 connector at said first end; and
said composite wireless access point further comprising a second female RJ45 connector adapted for electrical communication with said male RJ45 connector at said second end.

12. The multi spectrum internet appliance of claim 1, wherein said connection cable comprises low voltage Category 5e or Category 6 network patch cables.

13. The multi spectrum internet appliance of claim 11, wherein said connection cable comprises low voltage Category 5e or Category 6 network patch cables.

14. A system for implementing the use of renewably generated electrical power using a low voltage, direct current microgrid comprising:
at least one internet access point including a multi-spectrum internet access appliance comprising:
a composite wireless access point combining a data communication access element and an illumination element, wherein said data communicating access element and said illumination element are combined in a common fixture for replacing a conventional light fixture in a manner adapted for area or task illumination about an area around said fixture;
a power mechanism for providing low voltage direct current; and
a connection cable in electrical communication between said composite wireless access point and said power mechanism, wherein said connection cable comprises low voltage network patch cables;
wherein said composite wireless access point facilitates a wireless communication connection between said data communication access element and a communication network; and
wherein said LED lighting element provides production of at least 1800 lumen of visible light that may be tunable throughout a color spectrum and said multi spectrum internet access appliance further comprises:
an illumination reflector plate;
an antenna;
a heat sink assembly in contact with the fixture; and
a solid state network interface providing wireless communication through said antenna in conformance with standard Power over Ethernet protocol comprises IEEE 802.3bt four-pair Power over Ethernet standard, wherein said solid state network interface further provides:
at least 16 gigabits of bandwidth; and
at least 1 gigabit of radio signal for TCP/IP data traffic.

* * * * *